J. Van Doren.
Hay Cap.
N° 22,475. Patented Dec. 28, 1858.
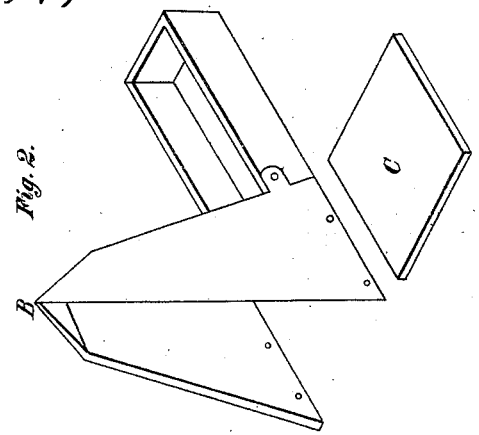
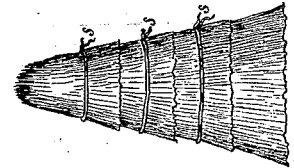
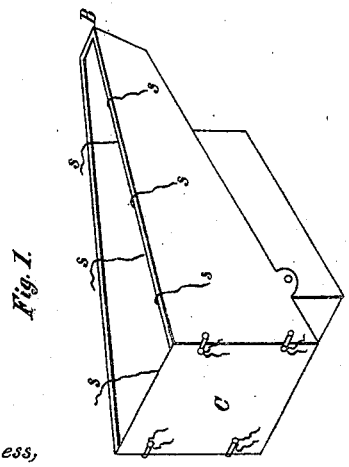
Witness, Thos Orton
Inventor, John Van Doren

UNITED STATES PATENT OFFICE.

JOHN VAN DOREN, OF FARM RIDGE, ASSIGNOR TO HIMSELF, AND B. MURRAY AND C. W. GLOVER, OF LA SALLE COUNTY, ILLINOIS.

IMPROVEMENT IN STACKING AGRICULTURAL PRODUCTS.

Specification forming part of Letters Patent No. 22,475, dated December 28, 1858.

*To all whom it may concern:*

Be it known that I, JOHN VAN DOREN, of the town of Farm Ridge, in the county of La Salle, in the State of Illinois, have invented a new and Improved Stack, Shock, or Cock for securing Cauline Agricultural Products from Damage by the Weather; and I do hereby declare that the following is a full, clear, and exact description thereof, reference being had to the accompanying drawings, making a part of this specification, and to the letters of reference marked thereon.

Figure 1 is a perspective view of the mold. Fig. 2 is a perspective view of same discharging the stack. Fig. 3 is a perspective view of the stack formed.

I am aware that shocks, cocks, and stacks of grain and other material have been shingled or covered, both by the same material of which they have been composed, as also by other material of a different character; and I am aware that such cocks, shocks, or stacks have been built up of bundles previously bound up and so that the heads shall be secured from the weather and point toward a common center; but I do not claim such manner of constructing cocks, shocks, or stacks, inasmuch as I do not bind up the material into small bundles first, but yet I do cause the butts of the stalks to cover the heads. My invention is limited to such cocks, shocks, or stacks as are intended to be higher than the length of the material of which it is to be composed, and not made up of a series of small bundles previously bound.

I am aware, also, that in harvesting-machines a gavel or bundle has been gathered into a box, and then dropped onto the ground, to be bound; but I do not claim the forming, gathering, or binding of a single gavel or bundle, as my invention relates to two or more lengths of straw or stalks put together in layers or strata, so that the butts shall cover the heads from the weather. My manner of forming the shock, cock, or stack is further limited to the placing of the stalks or straws in a box or former, that is of the shape or form that said shock, cock, or stack is to be when finished, as that the stalks or straws shall break joint with each other, and thus mutually support the entire bulk or mass. I therefore distinctly disclaim the making or binding of a gavel or bundle of grain; and I also disclaim the making of a cock, shock, or stack out of a series of single bundles previously bound.

My invention relates solely to the gathering or laying into a box or former, of the shape and size nearly of the cock, shock, or stack to be made, of the stalks or straws in strata or layers, and of two or more lengths of such stalks or straws, as that they shall break joint with each other, so that one or more bands shall hold two or more lengths of the straw or stalks.

To enable others skilled in the art to make and use my invention, I will proceed to describe the same with reference to the drawings.

B C represent a box or flask in which the cock or stack may be built, bands of any suitably flexible material having been previously laid therein to bind it when built up. A tier or layer of straw or any other material that is to be bound up is laid into the box with the heads toward the apex thereof. A second layer is placed on the first, with its heads farther from the apex than the first layer. A third and fourth layer are then placed with their heads, respectively, farther from the apex, but always so that the butts of the first layer shall cover the heads of the second, and so on throughout the series of layers until the box is half filled or the stack half made, and then the operation of laying the straws is reversed—that is to say, the top half of the stack, as it lies down, is built from the bottom toward the top in strata corresponding to those in its lower half; and when the box is thus filled the bands S are tightly drawn up around the stack and fastened and the box dumped up, so as to set the stack on its butt or larger end, and the operation is complete, as seen at Fig. 3. The outer portion, or, rather, that portion of the straw or other material that forms the outer part of the stack when finished, should be carefully and regularly laid; but the same care need not be expended on that portion that forms the center or core of the stack.

As illustrative of my invention and its novelty, I would remark that I am the first, so far as I have any knowledge to the contrary, to build a stack one half of which is built from the apex to the base and the other half from the base to the apex, the two halves so built, when united, forming a regular figure throughout its entirety, and its different strata breaking joint with each other, and thus strengthening the whole.

Having thus fully described the nature of my invention and how it differs from what has heretofore been done, what I claim as new, and desire to secure by Letters Patent, is—

The so placing of two, three, or more layers of stalks or straws in a box or former as that they shall break joint with each other, beginning at the apex, and so continuing until one half the stack is formed, and then reversing the operation and laying them from the base to the apex for the other half of the stack, so that when bound up they shall form a stack shingled on its outside to protect the interior, substantially as herein described and represented.

JOHN VAN DOREN.

Witnesses:
  A. A. FISHER,
  THOS. ORTON.